United States Patent

Sato et al.

[11] Patent Number: 5,861,589
[45] Date of Patent: Jan. 19, 1999

[54] VEHICLE AIR-CONDITIONING CONTROL SWITCH

[75] Inventors: Hiroyuki Sato; Yasuhiro Miyasaka, both of Miyagi-ken, Japan

[73] Assignee: Alps Electric Co., Ltd., Tokyo, Japan

[21] Appl. No.: 871,200

[22] Filed: Jun. 9, 1997

[30] Foreign Application Priority Data

Jun. 14, 1996 [JP] Japan .................................. 8-154034

[51] Int. Cl.⁶ ........................... H01H 9/00; H01H 25/00; B60H 1/00; B60R 16/00
[52] U.S. Cl. .......................... 200/5 R; 200/310; 200/313
[58] Field of Search ................................. 200/308, 311, 200/312, 313, 314, 5 A, 512, 517, 317; 180/333; 362/487–507, 85

[56] References Cited

U.S. PATENT DOCUMENTS

| | | | |
|---|---|---|---|
| 4,180,713 | 12/1979 | Gonzalezs | 200/52 R |
| 4,308,439 | 12/1981 | Itoh | 200/5 E X |
| 4,376,879 | 3/1983 | Nagata et al. | 200/314 |
| 4,701,629 | 10/1987 | Citroen | 307/10 R |
| 4,954,675 | 9/1990 | Iwata et al. | 200/317 |
| 4,994,635 | 2/1991 | Cummings et al. | 200/61.86 |
| 5,252,798 | 10/1993 | Kamada | 200/314 |
| 5,332,877 | 7/1994 | Oura et al. | 200/308 |
| 5,430,266 | 7/1995 | Austin, Jr. et al. | 200/302.1 |
| 5,491,313 | 2/1996 | Bartley et al. | 200/310 |
| 5,521,342 | 5/1996 | Bartley et al. | 200/5 A |

OTHER PUBLICATIONS

Communication From German Patent Office Dated Jun. 24, 1998 With English Translation.

*Primary Examiner*—J. R. Scott
*Attorney, Agent, or Firm*—Brinks Hofer Gilson & Lione

[57] ABSTRACT

An air-conditioning control switch for setting a direction in which conditioned air is to be blown from a vehicle air conditioner, which includes a defog mode switch section for defogging by at least blowing conditioned air to a vehicle window glass, a vent mode switch section for blowing conditioned air to the upper body of a person in the vehiche, and a foot mode switch section for blowing conditioned air to the lower body of a person in the vehicle. The defog mode switch section and the vent mode switch section are disposed substantially horizontally so as to be spaced apart, while the foot mode switch section is disposed downwardly of the defog mode switch section and the vent mode switch section. The vehicle air-conditioning control switch makes it possible to prevent improper operation thereof by arranging its switch sections for setting a direction in which conditioned air is to be blown in correspondence with the actual blowing locations, that is the blowing directions, forward, backward, upward, and downward.

9 Claims, 3 Drawing Sheets

VEHICLE AIR-CONDITIONING CONTROL SWITCH

BACKGROUND OF THE INVENTION

1. Field of the Invention

The present invention relates to a vehicle air-conditioning control switch for setting a direction in which conditioned air is to be blown from an air conditioner mounted to the vehicle.

2. Description of the Related Art

An air conditioner mounted to a vehicle is provided with an air-conditioning control switch for setting a direction in which conditioned air is to be blown. Conditioned air is blown in different directions by operation in a total of five typical modes, the first three being single modes and the remaining two being combined modes: (1) a vent mode in which conditioned air is blown to the upper body of a passenger, (2) a foot mode in which conditioned air is blown to the lower body of a passenger, (3) a defog mode in which conditioned air is blown to the window glass of a vehicle to defog the window glass, (4) a bi-level mode in which conditioned air is blown to both the upper body and lower body of a passenger at the same time, and (5) a defog/vent mode in which conditioned air is blown to both the vehicle glass of the vehicle and the lower body of a passenger.

The air-conditioning control switch used to set these five modes may include five separate pushbutton switches disposed side by side each other in order to set each of the modes, or may be a dial-type switch which can be set and adjusted to at least five rotational angles to set any one of the above-described five modes.

Higher technology vehicles has made it necessary to place various instruments and operating switches on a dash board that provides a limited space, and has thus caused the constant demand for size reduction, without reducing safety and visibility. Accordingly, when pushbutton switches are used, pictures or characters that symbolize the setting modes are formed on each of the keytops, and when a dial-type switch is used, pictures or characters that symbolize the setting modes are formed on each dial memory portion, so that a desired mode can be set without accidentally setting an undesired mode. However, the pushbutton switch keytop arrangement and dial switch scales depend on the vehicle type and the air conditioner type, even for the same manufacturer, so that an inexperienced operator is very likely to incorrectly operate the pushbutton switches or the dial switch, until he gets used to operating the switches or the dial switch.

SUMMARY OF THE INVENTION

Accordingly, a first object of the present invention is to provide a vehicle air-conditioning control switch which makes it possible to prevent improper operation thereof by arranging its switch sections for setting a direction in which conditioned air is to be blown in correspondence with the actual blowing locations, that is the blowing directions, forward, backward, upward, and downward.

A second object of the present invention is to provide a vehicle air-conditioning switch which allows setting to a desired mode by tilting the keytop upward, downward, forward, or backward in correspondence with the actual blowing locations.

To achieve the aforesaid first object, according to a first form of the present invention, there is provided a vehicle air-conditioning control switch for setting a direction in which conditioned air is to be blown from a vehicle air conditioner, the switch comprising: an operating button section in which any switch section is selected and turned on and off by pressing and tilting a location of a peripheral edge of an indicator section; and an indicator picture section, provided at the indicator section, which includes a picture representing a seated posture, wherein the switch sections are provided in accordance with blowing portions corresponding to the blowing locations of the indicator picture section.

To achieve the aforesaid first object, according to a second form of the present invention, there is provided a vehicle air-conditioning control switch for setting a direction in which conditioned air is to be blown from a vehicle air conditioner, the switch comprising: at least a defog mode switch section for defogging a vehicle window glass by blowing conditioned air thereto; a vent mode switch section for blowing conditioned air to the upper body of a person in the vehicle; a foot mode switch section for blowing conditioned air to the lower body of a person in the vehicle; and an operating button section in which each of the switch sections are selected and turned on or off by pressing and tilting a location of a peripheral edge of an indicator section, wherein the mode switch sections are disposed such that the foot mode switch section is disposed adjacent to the defog mode switch section, and the vent mode switch section is disposed adjacent to the foot mode switch section.

To achieve the aforesaid second object, according to a third form of the present invention, any two of the switch sections are both operated by operating a boundary portion between the two switch sections provided in accordance with the blowing portions corresponding to the blowing locations.

DESCRIPTION OF THE PREFERRED EMBODIMENT

A description will now be given of an embodiment of the present invention with reference to the drawings.

Figure 1:
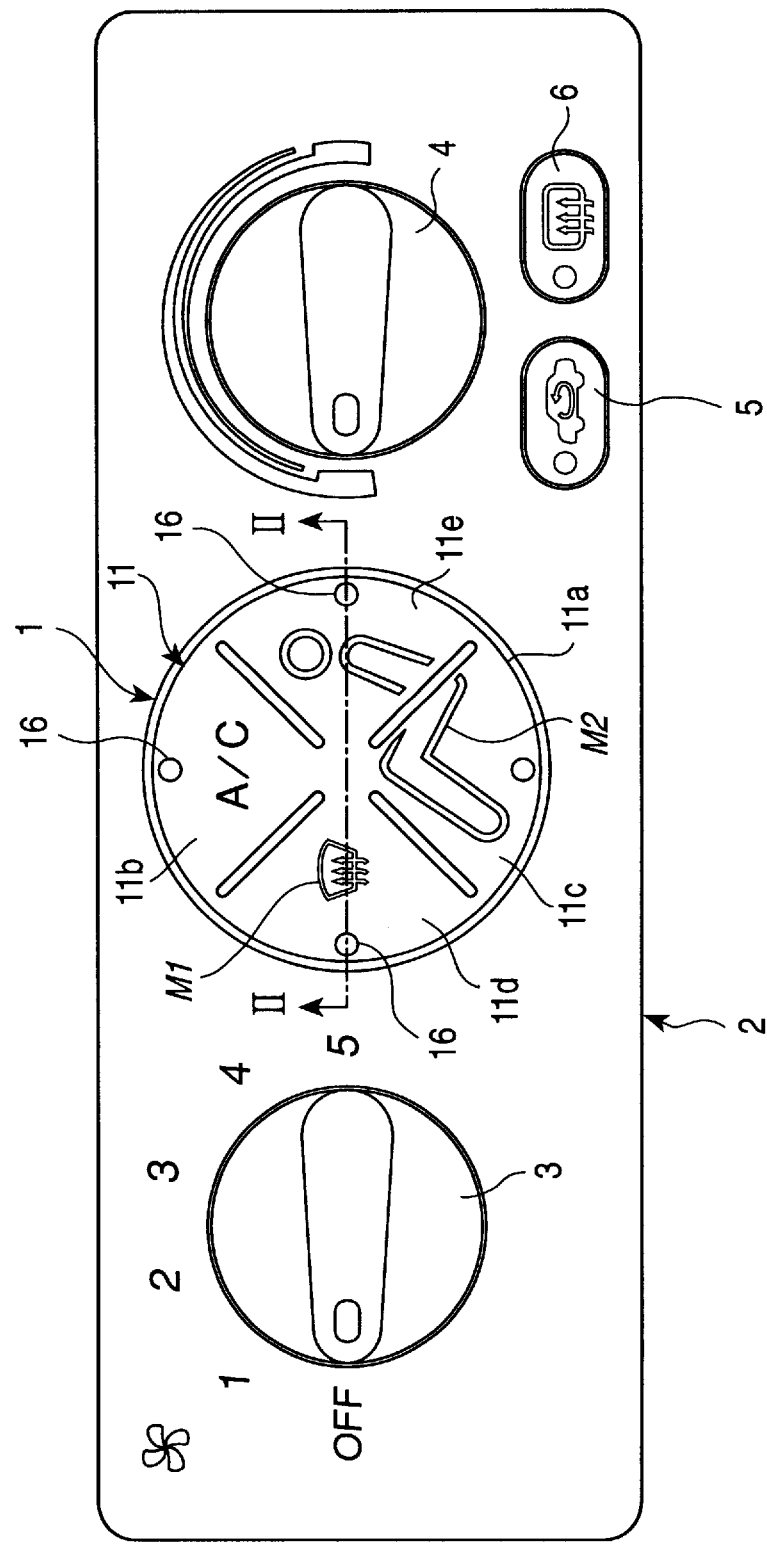
FIG. 1 is a plan view showing an arrangement of an air-conditioning control switch, controls, and buttons on an operation panel of the entire air-conditioner in an embodiment in accordance with the present invention.
Figure 2:
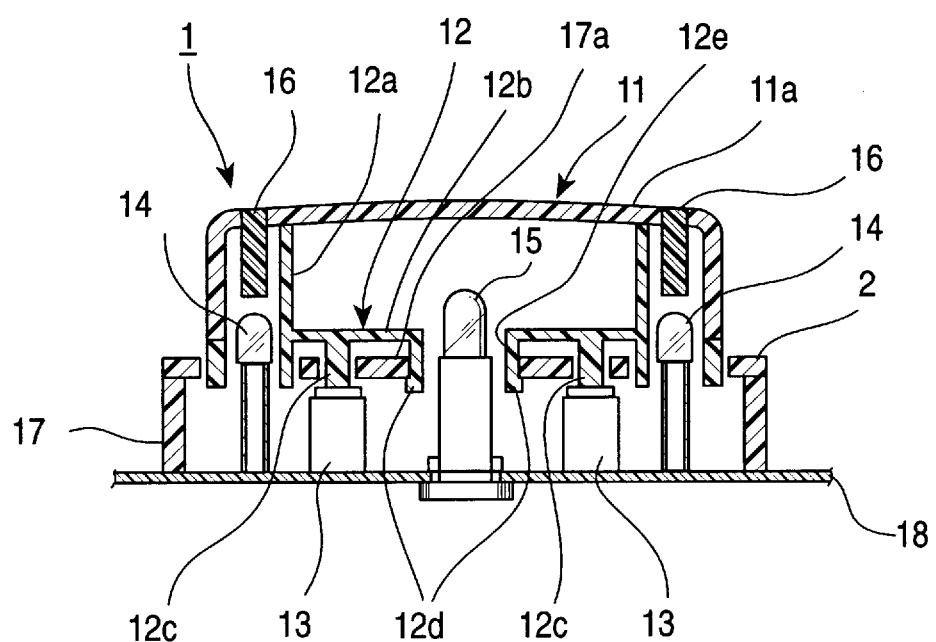
FIG. 2 is a vertical section taken along line II—II of FIG. 1.
Figure 3:
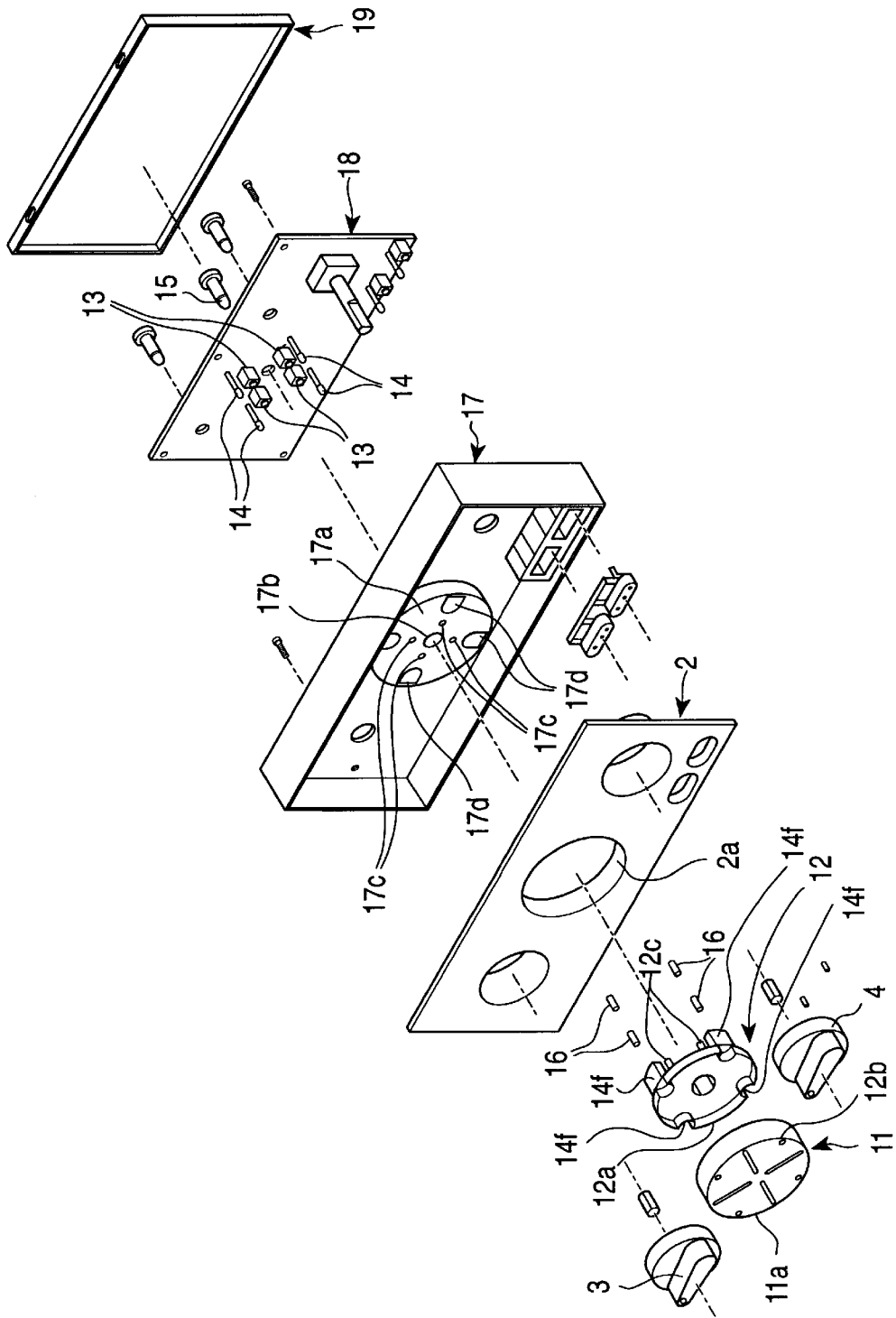
FIG. 3 is an exploded perspective view showing the mounting state of the air-conditioning control switch to the operation panel in the embodiment in accordance with the present invention.

FIG. 1 is a plan view showing an arrangement of an air-conditioning control switch, controls, and buttons on an operation panel of an embodiment in accordance with the present invention. FIG. 2 is a vertical section taken along line II—II of FIG. 2. FIG. 3 is an exploded perspective view showing the mounting state of the air-conditioning control switch to the operation panel in the embodiment.

As shown in FIG. 1, the air-conditioning control switch 1 is mounted to an operation panel 2. Onto the operation panel 2 are mounted a dial-type air volume control 3 for turning the air-conditioner on and off and adjusting the air volume, a dial-type temperature-adjusting control 4 for adjusting the temperature, a pushbutton-type circulation button 5 for circulating only conditioned air in the vehicle, and a ventilation button 6, which is similarly of the pushbutton-type, for ventilating the vehicle with outside air.

As shown in FIGS. 2 and 3, the air-conditioning control switch 1 primarily includes a substantially cylindrical keytop 11 with a bottom, a cover 12, four tact switches 13, four light-emitting diodes 14, and a lamp 15 which illuminates the entire keytop 11. The cover 12 prevents light leakage and is fixed within the keytop 11 by inserting it within the keytop 11. The four tact switches 13 are operated as a result of selectively pressing them by tilting the cover 12 used for preventing light leakage. The four light-emitting diodes indicate that these tact switches 13 have been operated.

The keytop 11 is inserted into an opening 2 of the operation panel 2 such that a disk-shaped bottom 11a faces the front. The bottom 11a is divided into four equal parts. The top part is the change-over switch section 11b for turning the air-conditioner on and off. The lower part is the foot mode switch section 11c for blowing conditioned air to the feet of a person in the vehicle. The left part in FIG. 1 is the defog mode switch section 11a for blowing conditioned air to the window glass. The right part in FIG. 1 is the vent mode switch section 11e for blowing conditioned air to the upper body of a person in the vehicle. Symbol marks are provided on each of the sections. The symbol mark "A/C" is provided on the change-over switch section 11b. The symbol mark of wind striking the window glass is provided on the defog mode switch section 11d, with the symbol mark designated M1 in FIG. 1. The symbol mark of a person is provided so as to extend from the vent mode switch section 11e to the foot mode switch section 11c, with the symbol mark designated M2 in FIG. 1. The upper body of the person occupies the vent mode switch section 11e, while the lower body of the person occupies the foot mode switch section 11c. Since light can pass through these symbol marks, any person in the vehicle can see the symbol marks at night by the light of the lamp 15. Light-guiding members 16, which may, for example, be either transparent or translucent, are mounted at one end to the outer periphery of the switch sections 11b to 11e, so as to be disposed midway between the boundary marks of each of the sections 11b to 11e.

The cover 12 for preventing light leakage includes a substantially cylindrical rim 12a inserted coaxially into the keytop 11, a disk-shaped section 12b integrally provided with the rim 12a and having a center opening, four operation protrusions 12c disposed in correspondence with each of the tact switches 13 at the back side of the disk-shaped section 12b, and retainer cylindrical sections 12e that extend toward the back side from the center opening of the disk-shaped section 12b and have retainer protrusions 12d formed at their back ends. Four recess-and-partition sections 14f are formed at equal intervals along the outer peripheral face of the rim 12a, and are provided with the light-emitting diodes 14.

The cover 12 for preventing light leakage is rockably held by the case 17 supporting the operation panel 2. More specifically, a cylindrical holding table 17a formed so as to protrude forwardly from the bottom of the case 17 is fitted to the rim 12a of the cover 12 used for preventing light leakage. An opening 17b for fitting therein the retainer cylindrical portions 12e is formed in the center of the holding table 17a. Accordingly, the cover 12 is rockably held by the case 17 by engaging the retainer protrusions 12d of the retainer cylindrical portions 12e with the peripheral edge of the opening 17b. The holding table 17a also has openings 17c for inserting the operating protrusions 12c of the cover 12, and openings 17d for inserting the recess-and-partition portions 14f.

The tact switches 13, the light-emitting diodes 14, the lamp 15, and the like are supported at the back side of the case 17. A printed board 18 with electrical circuits thereof printed thereon is mounted to the back side of the case 17. Switches and variable resistors for the air volume control 3, the temperature adjusting control 4, the circulation button 5, and the rear deflation button 6 are supported by the printed board 18. The printed board 18 is screwed to the back side of the case 17 and is covered by the cover 19.

The operating circuits of these switches and the lighting circuits of their corresponding light-emitting diodes 14 are previously set such that when the tact switch 13 of the foot mode switch section 11c and the tact switch 13 of the defog mode switch 11d are turned on at the same time, the operation is in a bi-level mode, and such that when the tact switch 13 of the foot mode switch section 11c and the tact switch 13 of the vent mode switch section 11e are turned on at the same time, the operation is in a defog/vent mode. In correspondence to this, the pressing strokes of the keytop 11 are previously set such that when a boundary of two mode switches is pressed, the two tact switches 13 adjacent to the pressed boundary operate.

In the present embodiment, pressing, for example, the defog mode switch section 11d of the keytop 11 at substantially the center of the switch section 11d causes the left side of the keytop 11 in FIG. 2 to move obliquely downward. This causes the operating protrusion 12c at the back side of the defog mode switch section 11d to move downward, and in turn causes the tact switch 13 disposed therebelow to be pressed. As a result of this, conditioned air flows to the window glass, defogging the window glass. Any passenger can easily know that the defog mode has been set by the light-emitting diode 14 of the defog mode switch section 11d that has been turned on.

In addition, the defog mode switch section 11d and the vent mode switch section 11e of the keytop 11 are placed in opposing relationship, so that when the operation is in the defog mode the defog mode switch section 11d is located forwardly of the passenger with respect to the passenger, causing him to visually know that air is being blown to the front glass or the like. The foot mode switch section 11c is located downwardly of the vent mode switch section 11e, causing the passenger to intuitively know that air is being blown to his feet, when the operation is in foot mode. Therefore, it is possible for anyone to operate the air conditioner without confusion, even in a vehicle which he is not used to, and to easily check which operation mode the operation is in, since the light-emitting diode 14 of the corresponding switch section turns on.

In order to find out whether these switch sections are on or off, key scanning is performed, for example, every 50 ms. When the key scanning is performed and a switch section is found to be on four times in a row, this means that the switch section has been turned on, so that operation control is performed in the mode corresponding to the switch section. Such a judgement can be made, since a switch, which has been turned on, is usually on for about 200 ms or more, thereby preventing incorrect operations.

Although in the above-described embodiment, one keytop is supported so as to be tiltable in all directions in order to switch the operating modes of the air conditioner based on the tilting direction, each operation mode can be set using separate switches for each mode, with the defog mode switch and the vent mode switch arranged at the left and right, and the foot mode switch arranged below the two switches, as with the present embodiment.

An auto-change-over switch section may be provided, instead of the change-over switch section 11b, in order to control automatic operation of the air conditioner. In this case, the tact switch 13 of the auto-change-over switch section 11b may be used only singly for on/off operations. In other words, when an attempt is made to turn on both the tact switch 13 of the auto-change-over switch section 11b and the tact switch 13 of the defog mode switch section 11d at the same time, neither one of the switch sections will be turned on. Therefore, any switch, except the indicator picture sections with a seated person, can be freely disposed.

According to a first form and a second form of the present invention, it is possible for anyone to operate the air conditioner without confusion even in a vehicle one is not used to, since the passenger can visually know that air is being blown toward the front glass with respect to the passenger during the defog mode, and can intuitively know that air is being blown toward his feet during the foot mode.

In addition, it is possible for any inexperienced operator of the operating button section to operate it without making a mistake, since a plurality of modes can be set using only one operating button section that can be easily operated by simply tilting it toward a desired direction for setting the mode.

According to a third form and a fourth form of the invention, both of which produce the operational effects of the first and second forms of the invention, it is possible to operate the boundary portion between the deaf mode section and the defog mode section to set these modes at the same time, as well as operate the boundary portion between the foot mode section and the vent mode section to set these modes at the same time, and also set combined modes, such as a bi-level mode or a defog/vent mode.

What is claimed is:

1. A vehicle air-conditioning control switch for setting a direction in which conditioned air is to be blown from a vehicle air conditioner, said switch comprising:
    at least a defog mode switch section for defogging a vehicle window glass by blowing conditioned air thereto;
    a vent mode switch section for blowing conditioned air to the upper body of a person in the vehicle;
    a foot mode switch section for blowing conditioned air to the lower body of a person in the vehicle; and
    an operating button section in which each of said switch sections are selected and turned on or off by pressing and tilting a location of a peripheral edge of an indicator section,
    wherein said mode switch sections are disposed such that said foot mode switch section is disposed adjacent to said defog mode switch section, and said vent mode switch section is disposed adjacent to said foot mode switch section.

2. A vehicle air-conditioning control switch for setting a direction in which conditioned air is to be blown from a vehicle air conditioner, said switch comprising:
    an operating button section in which any switch section is selected and turned on and off by pressing and tilting a location of a peripheral edge of an indicator section; and
    an indicator picture section, provided at said indicator section, which includes a picture representing a seated posture,
    wherein said switch sections are provided in accordance with blowing portions corresponding to the blowing locations of said indicator picture section, and
    wherein any two of said switch sections are both operated by operating a boundary portion between said two switch sections provided in accordance with the blowing portions corresponding to the blowing locations.

3. A vehicle air-conditioning control switch for setting a direction in which conditioned air is to be blown from a vehicle air conditioner, said switch comprising:
    an operating button section in which any switch section is selected and turned on and off by pressing and tilting a location of a peripheral edge of an indicator section;
    tact switches provided at each of said switch sections; and
    an indicator picture section, provided at said indicator section, which includes a picture representing a seated posture,
    wherein said switch sections are provided in accordance with blowing portions corresponding to the blowing locations of said indicator picture section.

4. A vehicle air-conditioning control switch for setting a direction in which conditioned air is to be blown from a vehicle air conditioner, said switch comprising:
    an operating button section in which any switch section is selected and turned on and off by pressing and tilting a location of a peripheral edge of an indicator section;
    an indicator picture section, provided at said indicator section, which includes a picture representing a seated posture; and
    light-emitting diodes provided at each of said switch sections, each diode indicating that said switch section corresponding thereto has been operated,
    wherein said switch sections are provided in accordance with blowing portions corresponding to the blowing locations of said indicator picture section.

5. A vehicle air-conditioning control switch for setting a direction in which conditioned air is to be blown from a vehicle air conditioner, said switch comprising:
    an operating button section in which any switch section is selected and turned on and off by pressing and tilting a location of a peripheral edge of an indicator section;
    an indicator picture section, provided at said indicator section, which includes a picture representing a seated posture; and
    a lamp for illuminating the entire indicator section,
    wherein said switch sections are provided in accordance with blowing portions corresponding to the blowing locations of said indicator picture section.

6. A vehicle air-conditioning control switch of claim 1, wherein a boundary portion between said defog mode section and said foot mode section is operated to operate both of said sections, and wherein a boundary portion of said foot mode section and said vent mode section is operated to operate both of said sections.

7. A vehicle air-conditioning control switch of claim 1, further comprising tact switches provided at each of said switch sections.

8. A vehicle air-conditioning control switch of claim 1, further comprising light-emitting diodes provided at each of said switch sections, each diode indicating that said switch section corresponding thereto has been operated.

9. A vehicle air-conditioning control switch of claim 1, further comprising a lamp for illuminating the entire indicator section.

* * * * *